United States Patent
Black et al.

(10) Patent No.: US 6,285,998 B1
(45) Date of Patent: Sep. 4, 2001

(54) SYSTEM AND METHOD FOR GENERATING REUSABLE DATABASE QUERIES

(75) Inventors: Neil W. Black, Redmond; Walter Kennamer, Issaquah; Dan Morrow, Redmond, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/255,741

(22) Filed: Feb. 23, 1999

(51) Int. Cl.$^7$ ....................................... G06F 17/30

(52) U.S. Cl. .................. 707/4; 707/1; 707/3; 707/10; 707/503; 707/504; 705/1; 705/35; 345/326

(58) Field of Search ............... 705/1, 35; 707/1, 707/2, 3, 4, 503, 504, 10; 345/326

(56) References Cited

U.S. PATENT DOCUMENTS

| | | | |
|---|---|---|---|
| 5,371,675 | * 12/1994 | Greif et al. | 707/503 |
| 5,604,854 | * 2/1997 | Glassey | 707/503 |
| 5,963,925 | * 10/1999 | Kolling et al. | 705/40 |
| 5,966,126 | * 10/1999 | Szabo | 345/348 |
| 5,966,695 | * 10/1999 | Melchione et al. | 705/10 |
| 5,983,200 | * 11/1999 | Slotznick | 705/2 |
| 6,138,130 | * 10/2000 | Adler et al. | 707/503 |

OTHER PUBLICATIONS

"Parameter queries feature of Microsoft Access 97", Microsoft Office 97/98 Resource Kit, taken from (www.microsoft.com/Office/ORK/035/035.htm) Jul. 6, 1999, p. 4 of 23.

* cited by examiner

Primary Examiner—Jack Choules
Assistant Examiner—Cheryl Lewis
(74) Attorney, Agent, or Firm—Banner & Witcoff, Ltd.

(57) ABSTRACT

An improved user interface and query method permits a computer user to quickly specify field names, operators, and desired values for a database query. One or more of the desired values can be specified as an "ask me" value that will cause the user to be prompted (each time the query is to be executed) for a desired value prior to executing the query. A "wizard-like" set of dialog boxes guides the user through prompts to supply values for all such "ask me" values in a compound query. Rather than presenting the user with arcane logical operators and a formalistic query language, logical operators are converted into ordinary English phrases. The user can save the query for later re-use or modification. Another feature prompts the user with a constrained list of possible values that a field can assume, forcing the user to select from among the constrained values rather than requiring the entry of a discrete value. When the user specifies an "ask me" value for one of these fields, the constrained list is presented to the user before the query is executed. The invention can be implemented as an ActiveX control that executes in a web browser on a client computer.

22 Claims, 16 Drawing Sheets

Investment Finder - MSN Investor - Microsoft Internet Explorer

Address: http://investor.msn.com/finder/customstocks.asp

Investment Finder
- Welcome
- Pre-Defined Search
- ☆ Custom Search
  - Stocks
  - Funds
- ☆ Investment Matcher Search5 — 1404   Return Top [25] Matches

| Field Name | Operator | Value |
|---|---|---|
| P/E Ratio: Current | <= | <Ask Me> |
| Industry Name | = | <Ask Me> |
| 52-Week High | Near | 50 |

Field Description

[Run Search]  Compare With: [____] 1401  [Add]  [Find]

| Symbol | Company Name | | | | | | | |
|---|---|---|---|---|---|---|---|---|
| MSFT | Microsoft Corporation | | | | | 67.70 | Application So... | 175.94 |

| | | Δ Rank | P/E Ratio: Current | Industry Name | 52-Week High |
|---|---|---|---|---|---|
| Symbol | Company Name | Rank | P/E Ratio: Current | Industry Name | 52-Week High |
| CPL | Carolina Power & Light Company | 1 | 14.70 | Electric Utilities | 49.63 |
| NES | New England Electric System | 2 | 16.20 | Electric Utilities | 49.50 |
| DTE | DTE Energy Company | 3 | 13.10 | Electric Utilities | 49.25 |
| PNW | Pinnacle West Capital Corporation | 4 | 14.00 | Electric Utilities | 49.25 |
| D | Dominion Resources, Inc. | 5 | 15.80 | Electric Utilities | 48.94 |
| TXU | Texas Utilities Company | 6 | 19.00 | Electric Utilities | 48.06 |
| GPU | GPU, Inc. | 7 | 14.90 | Electric Utilities | 47.19 |
| FPC | Florida Progress Corporation | 8 | 14.00 | Electric Utilities | 47.13 |

The result returned the 25 best-fit matches out of 50

(1402, 1403 annotations)

SYSTEM AND METHOD FOR GENERATING REUSABLE DATABASE QUERIES

TECHNICAL FIELD

This invention relates generally to computer-implemented database query techniques. More particularly, the invention provides a way to create and re-use database queries for execution against a database such as an investment database.

BACKGROUND OF THE INVENTION

Investment databases conventionally store quantitative information regarding stocks, mutual funds, and other types of investments. Investors and financial analysts can query such databases using conventional database query tools and techniques. For example, an investor can query such a database to identify all stocks having a price-to-earnings ratio (P/E) less than 40 using a query string such as "P/E<40." In such a query, "P/E" identifies a column in a database table, "<" indicates an operator to be applied in the query, and "40" indicates a desired value to which the operator will be applied in order to qualify the database query results. Users can also concatenate multiple criteria into a single query to create compound queries (e.g., "P/E<40 AND growth rate>10%"). With such compound queries, multiple conditions must be satisfied before a record is included in the query results.

One problem with conventional database query techniques is that it is difficult and cumbersome to save and reuse previous queries with slightly different parameters. For example, if an investor changed his investment interest to companies having a P/E<50 while leaving the other query parameters unchanged, he would have to save the query string, edit the string to locate the 40 and replace it with 50, and re-run the query. Additionally, the user may have difficulty remembering allowable values for fields that can assume only a predetermined set of values (e.g., the name for a particular industry), thus increasing the possibility of user input error. Where a large number of criteria are needed, these problems are compounded.

The "Access" database product sold by Microsoft Corporation provides a "parameter query" feature that permits a user to enter a parameter value at query execution time. As shown in FIG. 15, for example, a user can create a database query by selecting a field name ("LastName") and specifying a text message that will be displayed when the query is executed. In FIG. 15, the user-specified text message is "What is the last name of the user you are looking for?" When the query is executed, the database query engine detects the special parameterized query and prompts the user to enter a value for the field, as shown in FIG. 16. Consequently, one possible approach for implementing reusable database queries is to use a "parameter query" feature such as that found in the Access database product.

The techniques shown in FIGS. 15 and 16 are generally not well suited for implementing reusable database queries, and incur high processing costs. For example, the database query engine runs until it hits a parameterized query such as that shown in FIG. 15, and then must stop the query until the user enters a value for the parameter. This wastes valuable processing time, particularly in a client/server environment where the database engine is located on a server computer and services a plurality of client computers. Moreover, the techniques shown in FIGS. 15 and 16 are not particularly user-friendly and require substantial knowledge and typing on the part of the user. For example, the user must actually create a prompt and type it into the table shown in FIG. 15. Such techniques would not be well suited for novice investors, for example, who may not be knowledgeable about databases and their modes of operation.

SUMMARY OF THE INVENTION

The present invention provides an improved user interface and query method that permits a user to quickly specify field names, operators, and desired values. One or more of the desired values can be specified as an "ask me" value that will cause the user to be prompted, each time the query is executed, to supply a desired value prior to actually submitting the query to the database engine. The user can be presented with a "wizard-like" sequence of dialog boxes to supply all such "ask me" values in a compound query. Rather than presenting the user with arcane logical operators and a formalistic query language, operators and desired values are provided using ordinary English phrases. The user can then save the query for later re-use or modification.

Another feature of the invention prompts the user with a constrained list of possible values that a field can assume, forcing the user to select from the list rather than requiring the entry of a discrete value. When the user specifies an "ask me" value for one of these fields, the constrained list is presented to the user before the query is executed.

Yet another feature of the invention provides a "comparison pane" which permits the user to quickly compare an investment of interest (e.g., from the user's portfolio) to database query results on the same display. Investments of interest that match database query results are automatically highlighted on the display.

The invention can be implemented as an ActiveX® control or Applet that executes in a web browser on a client computer. The control communicates with a database engine on a web site via HTTP protocols in order to provide query results.

BRIEF DESCRIPTION OF THE DRAWINGS

FIG. 13 shows query results 1301 that match the criteria specified by the user.

FIG. 14 shows a comparison pane 1402 that permits comparison between a user-selected security and the query results.

DETAILED DESCRIPTION OF THE INVENTION

Figure 1:
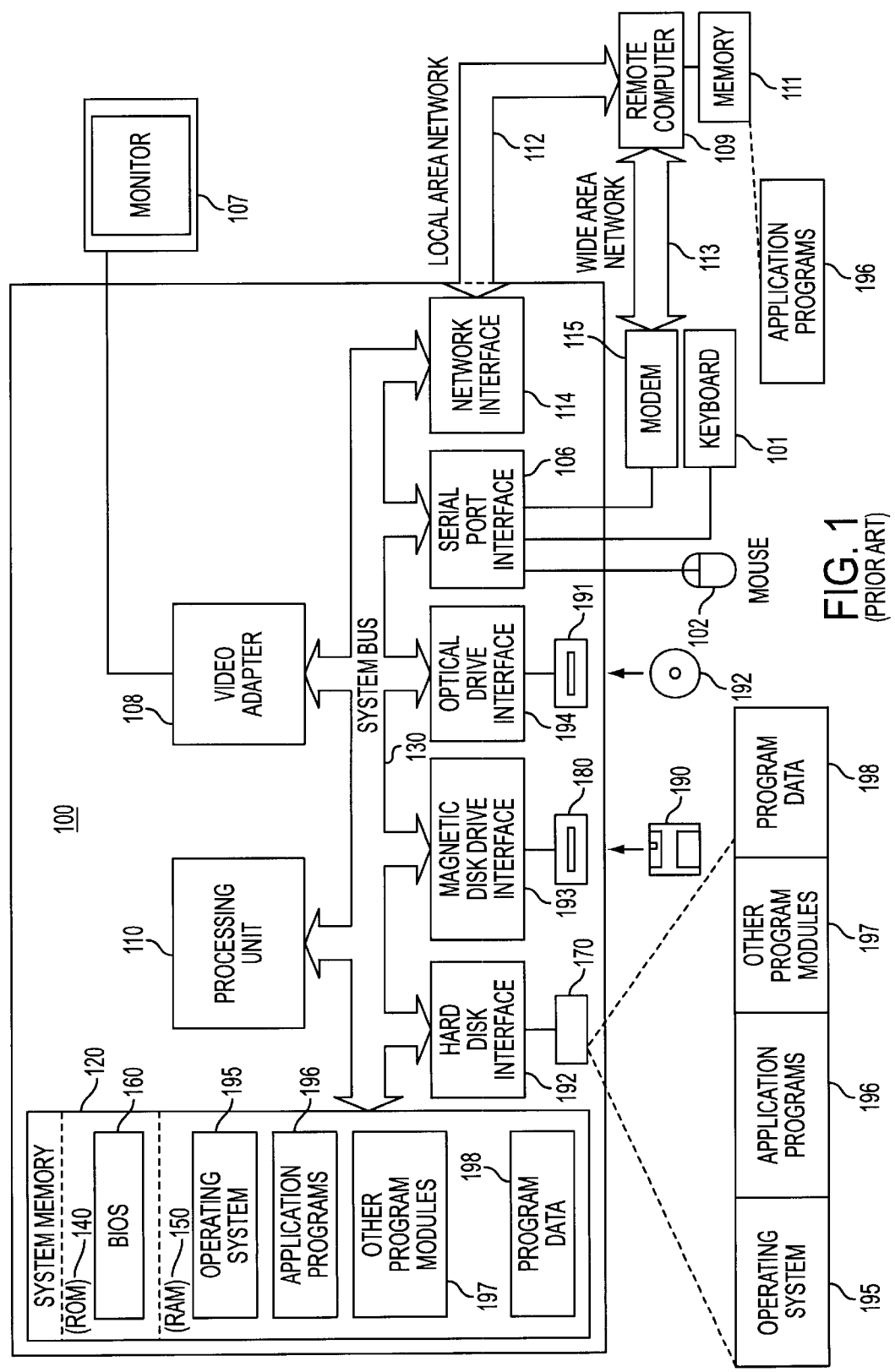
FIG. 1 shows a conventional general-purpose computing environment that can be employed in various embodiments of the invention.

FIG. 1 is a schematic diagram of a conventional general-purpose digital computing environment that can be used to implement various aspects of the invention. Computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory includes read only memory (ROM) 140 and random access memory (RAM) 150.

A basic input/output system 160 (BIOS), containing the basic routines that help to transfer information between elements within the computer 100, such as during start-up, is stored in ROM 140. Computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules can be stored on the hard disk, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner, or the like. These and other input devices are often connected to the processing unit 110 through a serial port interface 106 that is coupled to the system bus, but may be connected by other interfaces, such as a parallel port, game port or a universal serial bus (USB).

A monitor 107 or other type of display device is also connected to the system bus 130 via an interface, such as a video adapter 108. In addition to the monitor, personal computers typically include other peripheral output devices (not shown), such as speakers and printers.

The computer 100 can operate in a networked environment using logical connections to one or more remote computers, such as a remote computer 109. Remote computer 109 can be a server, a router, a network PC, a peer device or other common network node, and typically includes many or all of the elements described above relative to computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are exemplary and other means of establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Figure 2:
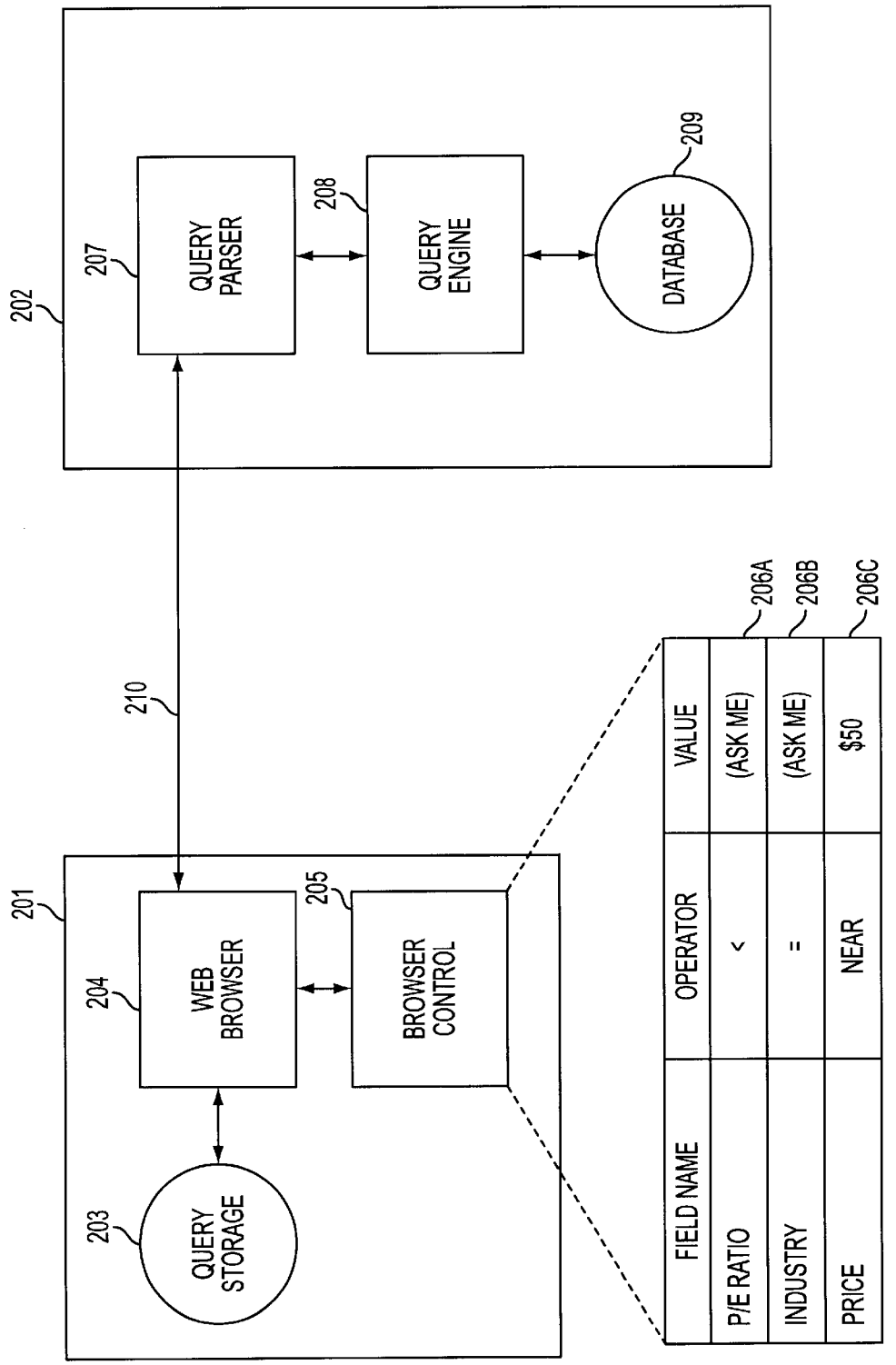
FIG. 2 shows a web-based distributed system employing various principles of the present invention.

FIG. 2 shows a web-based distributed system employing various principles of the present invention. As shown in FIG. 2, a client computer 201 is coupled to a server computer 202 over an interface or network 210, which may comprise the Internet. According to one embodiment of the invention, client computer 201 communicates with server computer 202 using HTTP and HTML protocols in order to retrieve and display web pages from server computer 202. As shown, client computer 201 includes a web browser 204 that may comprise any of a number of commercially available web browsers, and a browser control element 205 that operates in accordance with the inventive principles. Browser control 205 may comprise code that executes within the environment of web browser 204, and may be implemented as a so-called "Applet" or as an ActiveX® control. Server computer 202 includes a query parser 207 that receives a query from client computer 201, parses it into its constituent parts, and provides it to query engine 208, which searches database 209 to identify records or objects matching the search criteria.

According to one aspect of the invention, browser control 205 generates a query grid display 206 comprising columns of field names, operators, and desired values. The user can enter desired information into the cells of the query grid in order to build a reusable query, and can store the queries in query storage area 203 on client computer 201.

A user of client computer 201 need not specify a fixed value (e.g., 40) in each cell of the "value" column, but can instead specify an "ask me" value 206A that will cause the user to be prompted by client computer 201 for a value each time the query is executed. Moreover, for fields having a discrete set of acceptable choices (e.g., industry name), the user can specify an "ask me" value 206B that will generate a list of choices (a "constrained value") rather than forcing the user to enter a value. The user can also specify fixed values such as 206C that are not likely to change when the query is again executed at a later time.

The user can enter data values by clicking with a mouse in one of the cells of the grid, and a pop-down menu (not shown in FIG. 2) can be provided to assist the user in specifying field names, operators, and desired values. It is contemplated that each row in query grid 206 will be logically "ANDed" with other rows to form a compound query, although the invention is not limited in this respect. Because client computer 201 prompts the user for the desired values upon detecting an "ask me" value in the query grid, the query can be constructed and executed more quickly than if this work were performed by server computer 202. Consequently, it is desirable to perform the query construction, pre-processing, and storage on client computer 201 as opposed to server computer 202. Moreover, it is desirable to prompt the user with ordinary English-language prompts that lead the user through the data entry process for any values that require specification at query execution time. Further details of various possible user interfaces that accomplish these objectives are described below.

Figure 3:
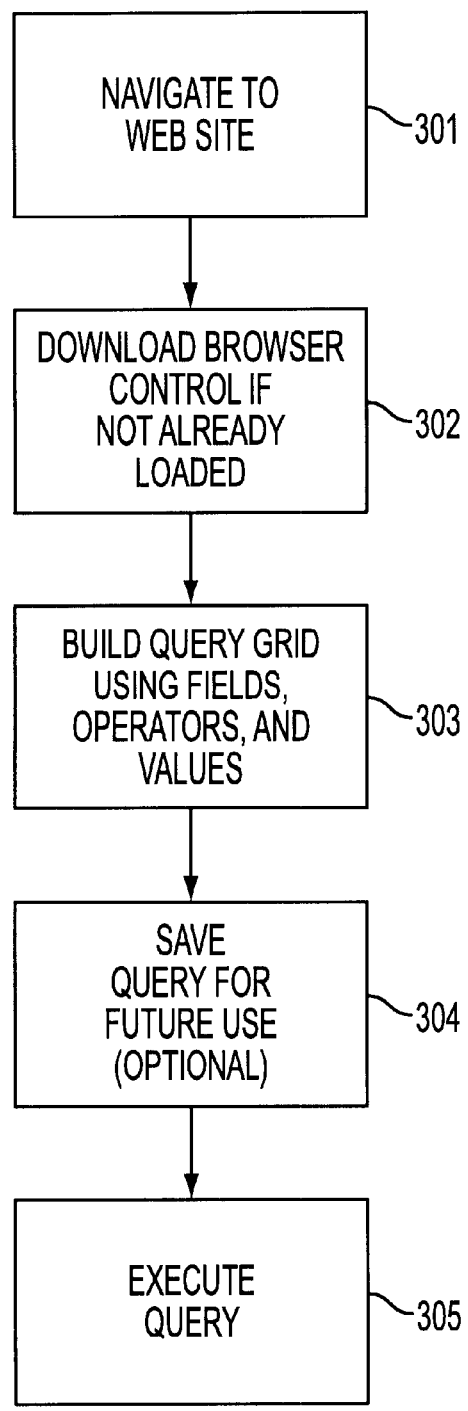
FIG. 3 shows a series of steps that can be performed to create and execute a query in accordance with one aspect of the invention.

Turning now to FIG. 3, a series of steps is shown for building and executing a reusable query in accordance with one aspect of the invention Beginning in step 301, a user at client computer 201 navigates to a web site hosted on server computer 202 (It will be appreciated that the principles of the invention can be practiced without performing the query over the Internet). After navigating to the web site, in step 302 web browser 204 determines whether it has previously downloaded a current copy of browser control element 205. This step is conventional and could include subsidiary steps of determining whether a more recent version of browser control element 205 exists on server 202. If browser control element 205 has not previously been loaded onto client computer 201, web browser 204 loads it from server computer 202 and stores it locally in persistent memory, such as in a disk file.

In step 303, a query grid such as grid 206 of FIG. 2 is built by permitting the user to specify field names, operators, and desired values. As explained previously, the user can choose to not specify certain desired values at query creation time, leaving one or more desired values to be determined just prior to executing the query. Such unspecified values will be referred to as "ask me" values to indicate that the user will be prompted to supply the missing information just prior to executing the query. Various user interface constructs and methods can be provided to prompt the user for any missing information prior to executing the query.

In addition to leaving desired values open, it will be appreciated that operators could also be specified as "ask me" values. For example, the user could choose to always be prompted for an operator (e.g., greater than, less than, equal to, etc.) at the time the query is executed, rather than specifying in advance a predetermined operator in the query. A query could be constructed with multiple rows of completely specified field names, operators, and desired values, and one or two rows of partially specified values, thus allowing the user to reuse large parts of a previously used query while modifying only one or two variables each time the query is re-run.

In step 304, the user can optionally save the query for future use in query storage area 203 on client computer 201. This storage area could instead be located on another computer such as server computer 202. Moreover, the optional saving step could instead be performed after executing the query without departing from the scope of the invention. According to this aspect of the invention, the user can locally store a plurality of queries on the client computer in order to modify and reuse them at a future date.

Finally, in step 305 the query is executed on server computer 202. As described below, this can include subsidiary steps of prompting the user for "ask me" values before executing the query; building a compact query string for transmission to server computer 202; parsing the query string in query parser 207; executing the query in query engine 208; and returning query results to web browser 204 for display to the user.

Figure 4:
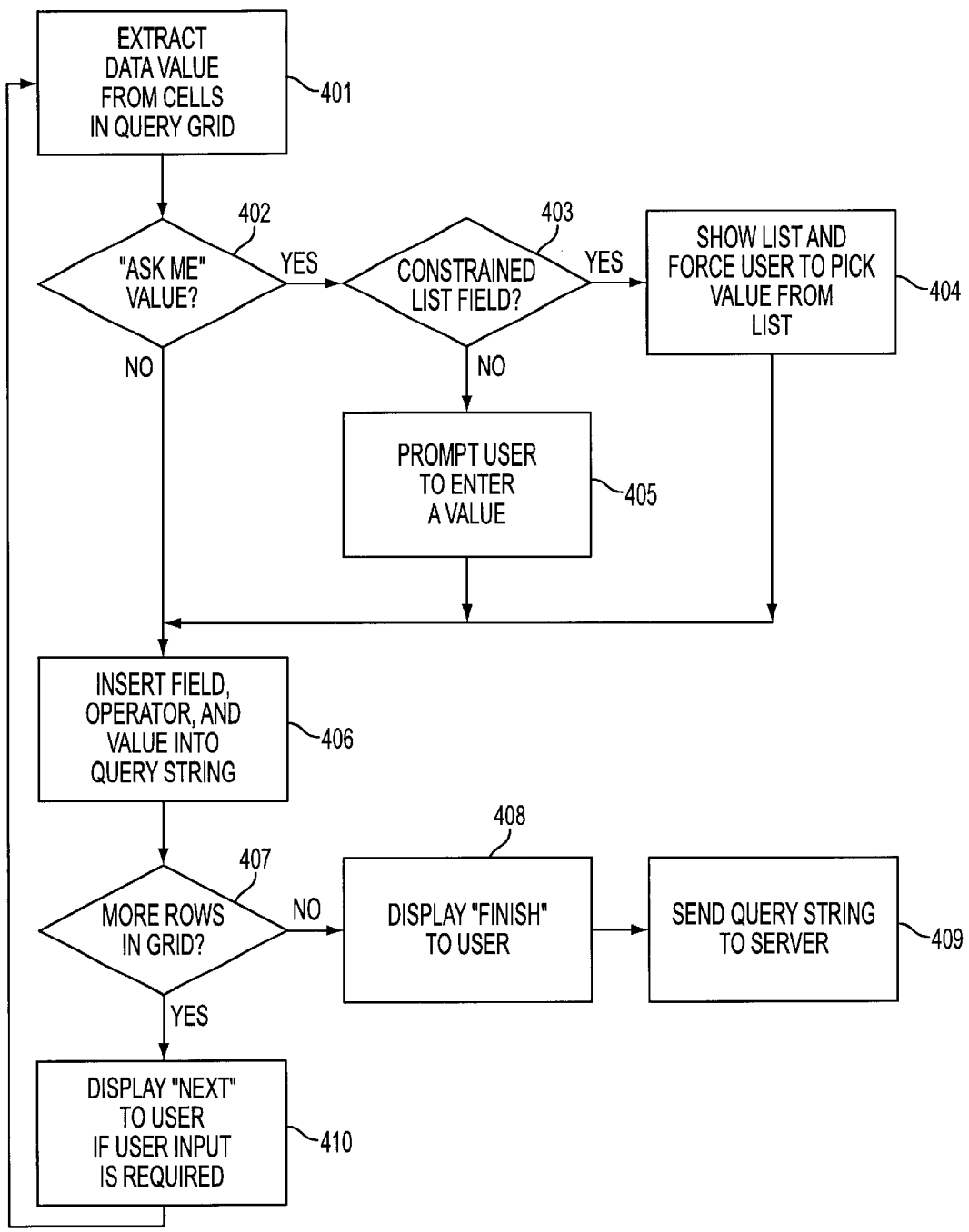
FIG. 4 shows a series of steps that can be performed to execute a query that was previously created with one or more "ask me" values specified for a desired value.

FIG. 4 shows additional details of one possible approach for carrying out the query execution step. In FIG. 4, it is assumed that a query grid has been prepared by a user, wherein the grid contains one or more "ask me" values in place of fixed desired values. It is also assumed that the steps in FIG. 4 are performed by browser control element 205 on client computer 201 (see FIG. 2).

Beginning in step 401, a data value is extracted from a cell of the query grid (e.g., the value column of the first row of the query grid). Although not shown in FIG. 4, it is assumed that "ask me" values could also be specified for cells containing operators. In step 402, a determination is made as to whether the value is an "ask me" value. If so, then in step 403 a determination is made as to whether the value is one corresponding to a constrained list field. For example, a field that can take on only a limited number of predetermined values (e.g., industry name) can be created in advance so that the user need not specify a value but can instead select a value from the predetermined list. If the field is such a constrained list field, then in step 404 the user is presented with a list of possible values for the field and he or she must select one of those values.

If, in step 403, the field is not one corresponding to a constrained list, then in step 405 the user is prompted to enter a desired value for the field. For example, if the field is P/E ratio, the user could enter a numeric value such as 40. If the field is a text value such as a symbol name for a stock, the user could enter a text value. As described in more detail below, steps 404 and 405 are preferably performed using a user-friendly wizard-like dialogue box that asks the user for a value in ordinary English terms.

In step 406, after a value has been extracted from a cell in the grid (following step 402), or after the user has selected a value from a constrained list (step 404) or specified a value (step 405), the value is inserted into a query string. In one embodiment, the query string is constructed using compact fields in order to minimize the amount of data transmitted to server computer 202. For example, a compound query of the form "P/E<40 AND 52-week high<50" can be compressed into a compact string of the form "F33LT40,F62LT50", where F33 indicates field number 33 (corresponding to the P/E column in the database), "LT" indicates a less than operator, and 40 indicates the desired value for the field. Similarly, F62 might indicate to server computer 202 that field number 62 (corresponding to 52-week high price) has been selected, "LT" indicates a less than operator, and 50 indicates the desired value for that field. Query parser 207 in server computer 202 parses this compact query string to create a query string suitable for execution by query engine 208, such as a SQL standard database query.

After the extracted or user-supplied value is added to the query string in step 406, a test is executed in step 407 to determine whether there are any more rows in the query grid. If there are more rows, then in step 410 the user is presented with a "next" display prompt (if user input is required), and step 401 is again executed. For cells in the query grid that do not require user input at execution time, the user need not be prompted with a "next" prompt; instead, the value previously specified by the user at query creation time is extracted from the cell and added to the query string as shown in steps 401 and 406.

If, in step 407, there are no more rows, a "finish" prompt can be displayed to the user in step 408. When the user selects "finish," the query string is sent to server computer 202 in step 409 for query execution.

FIGS. 5 through 14 show one possible user interface method and system for building reusable database queries and executing those queries in accordance with the foregoing description.

Figure 5:
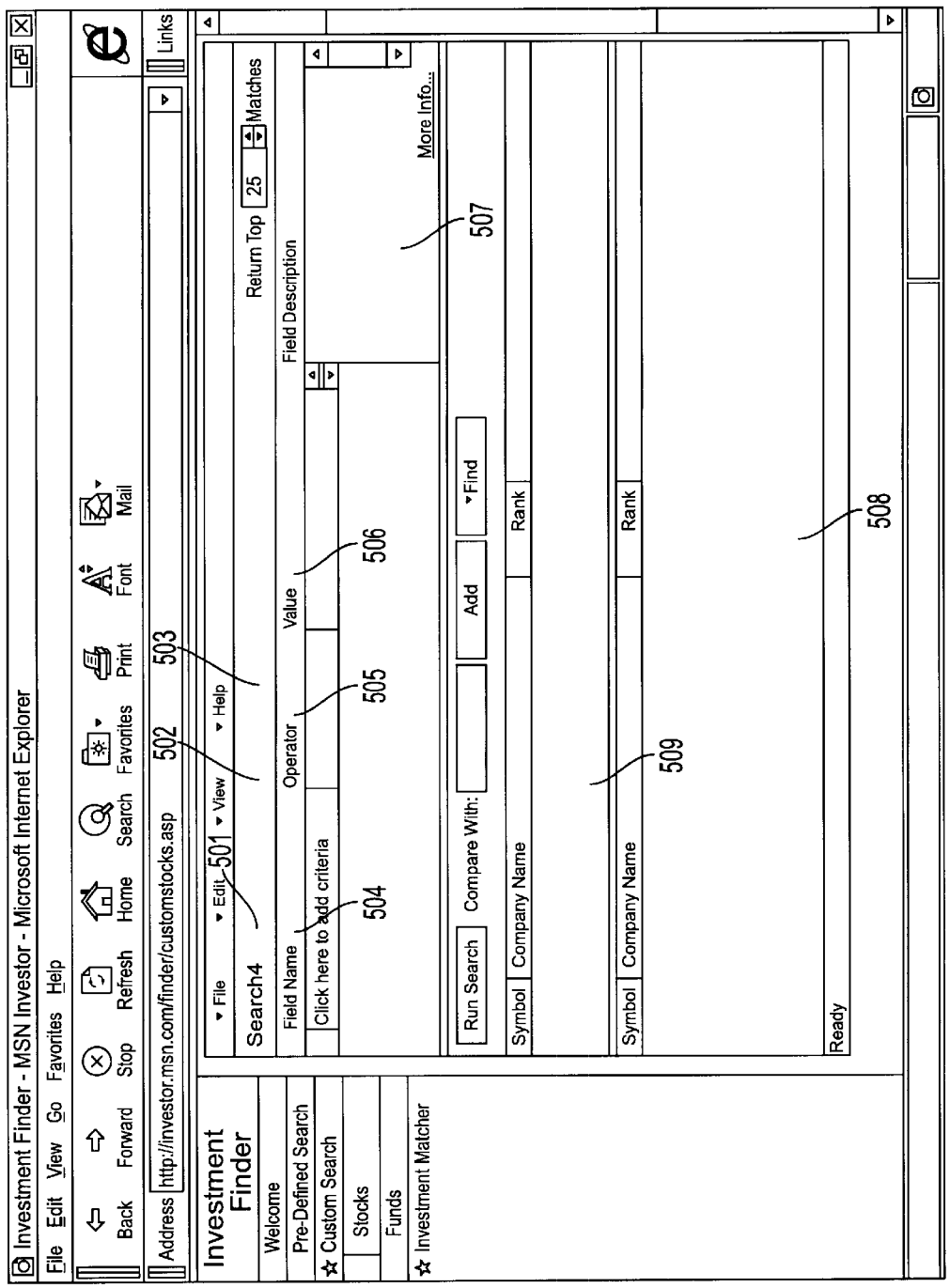
FIG. 5 shows one possible user interface that permits a user to build a query comprising rows of field names, operators, and desired values.

As shown in FIG. 5, a web browser displays a web page from server computer 202. The web page includes a query grid including three columns: field name 501; operator 502; and value 503. Cells in the query grid provide an area in which the user can enter data. For example, the user can enter a field name in cell 504, an operator in cell 505, and a desired value in cell 506. A descriptive display area 507 displays information describing a field that has been entered in a currently selected cell. After the query is executed, query results are displayed in a results display region 508 (blank in FIG. 5). A "comparison pane" area 509 permits the user to compare the query results with one or more data items of interest.

It is contemplated that the query grid and other display constructs shown in FIG. 5 are generated by browser control element 205 (see FIG. 2), and that the processing steps that permit a user to enter information into the query grid are performed by browser control element 205 executing on client computer 201.

Figure 6:
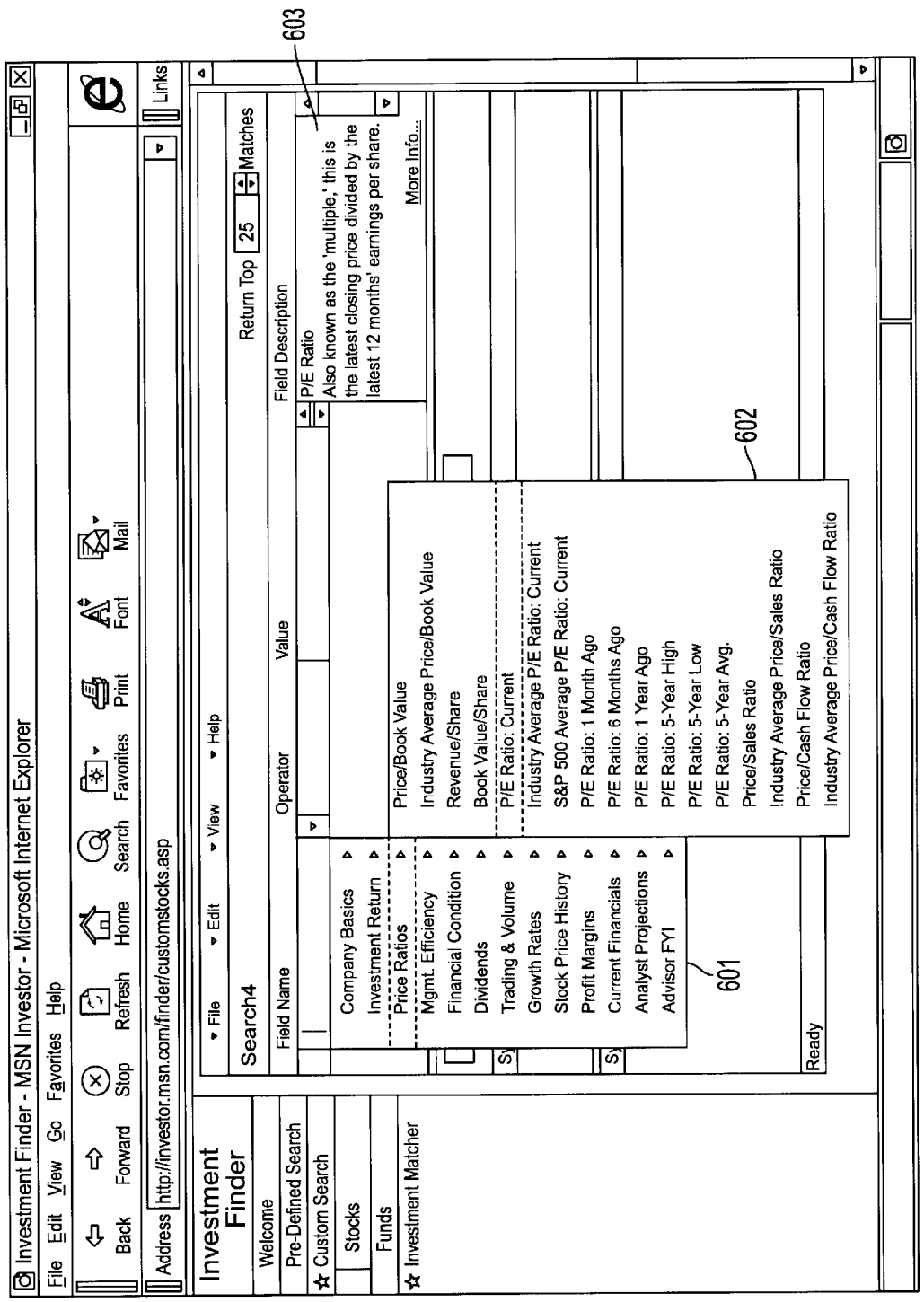
FIG. 6 shows cascading pull-down menus that permit a user to select a field name as part of the query building process.

In accordance with one aspect of the invention, a user can click in a cell in order to see a context-sensitive list of possible choices for that field. Turning to FIG. 6, for example, by clicking a mouse button while the cursor is positioned in the first cell of the query grid, a cascading menu 601 and 602 is provided to the user. As shown in FIG. 6, the cascading menu lists field names grouped by categories. By using a mouse or similar keyboard strokes, the user can specify a field name (e.g., P/E Ratio: Current). While traversing the possible choices for field names, a field description is provided in an information box 603 on the display. A "more info" hyperlink can also be provided to permit the user to learn more information about the selected field.

Figure 7:
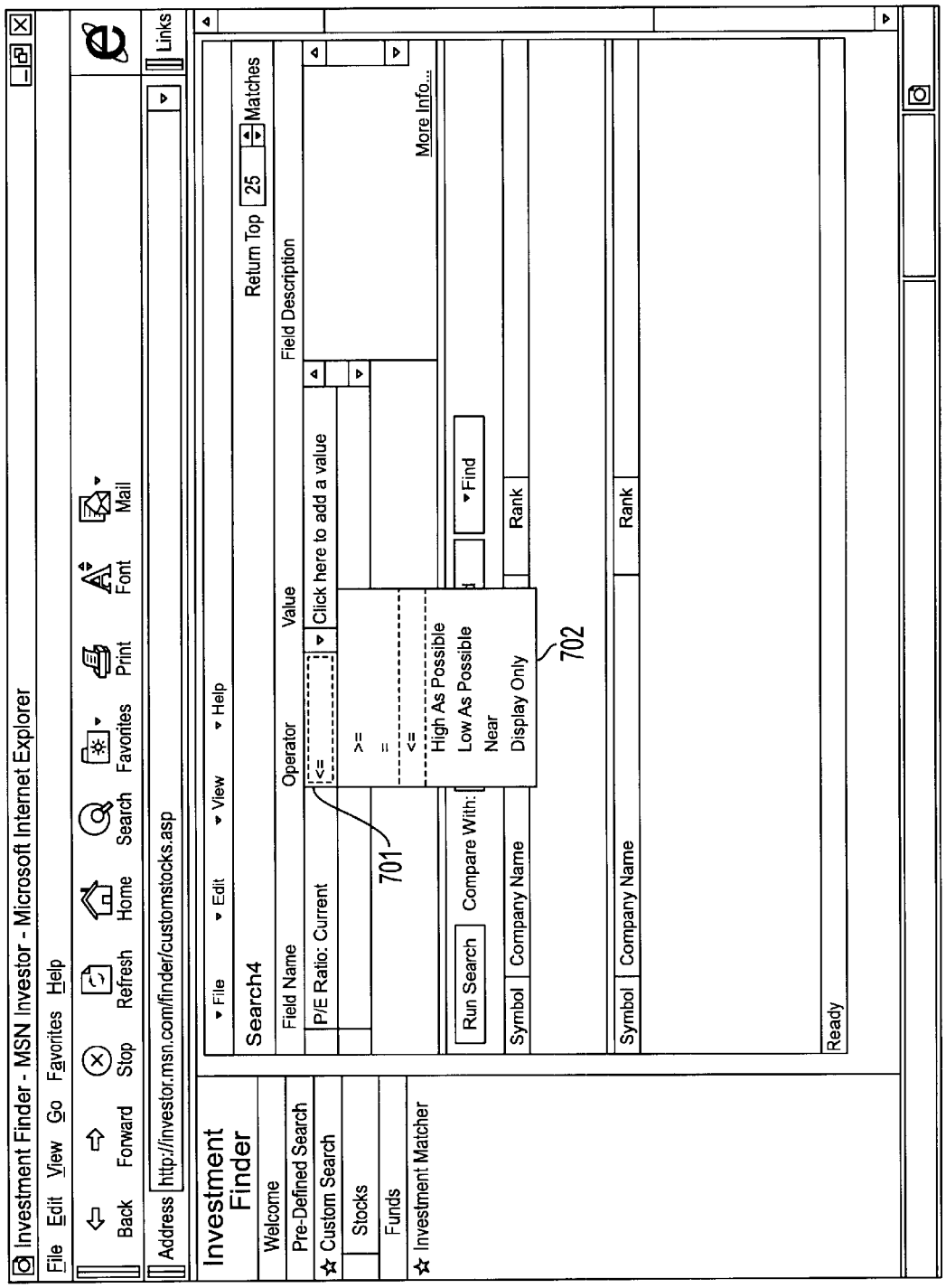
FIG. 7 shows a pull-down menu that permits a user to select an operator as part of the query building process.

In FIG. 7, it is assumed that the user selected "P/E Ratio: Current" as the first field in the query. Next, by clicking a mouse button in the operator column in cell two, the user can select an operator 701 from a menu of possible operators 702. In additional to conventional "greater than or equal to", "equal to", and "less than or equal to", other operators such as "high as possible" or "near" can be provided. Additionally, the user can specify "display only" to indicate that a field should be retrieved and displayed only rather than qualified according to some criteria.

Figure 8:
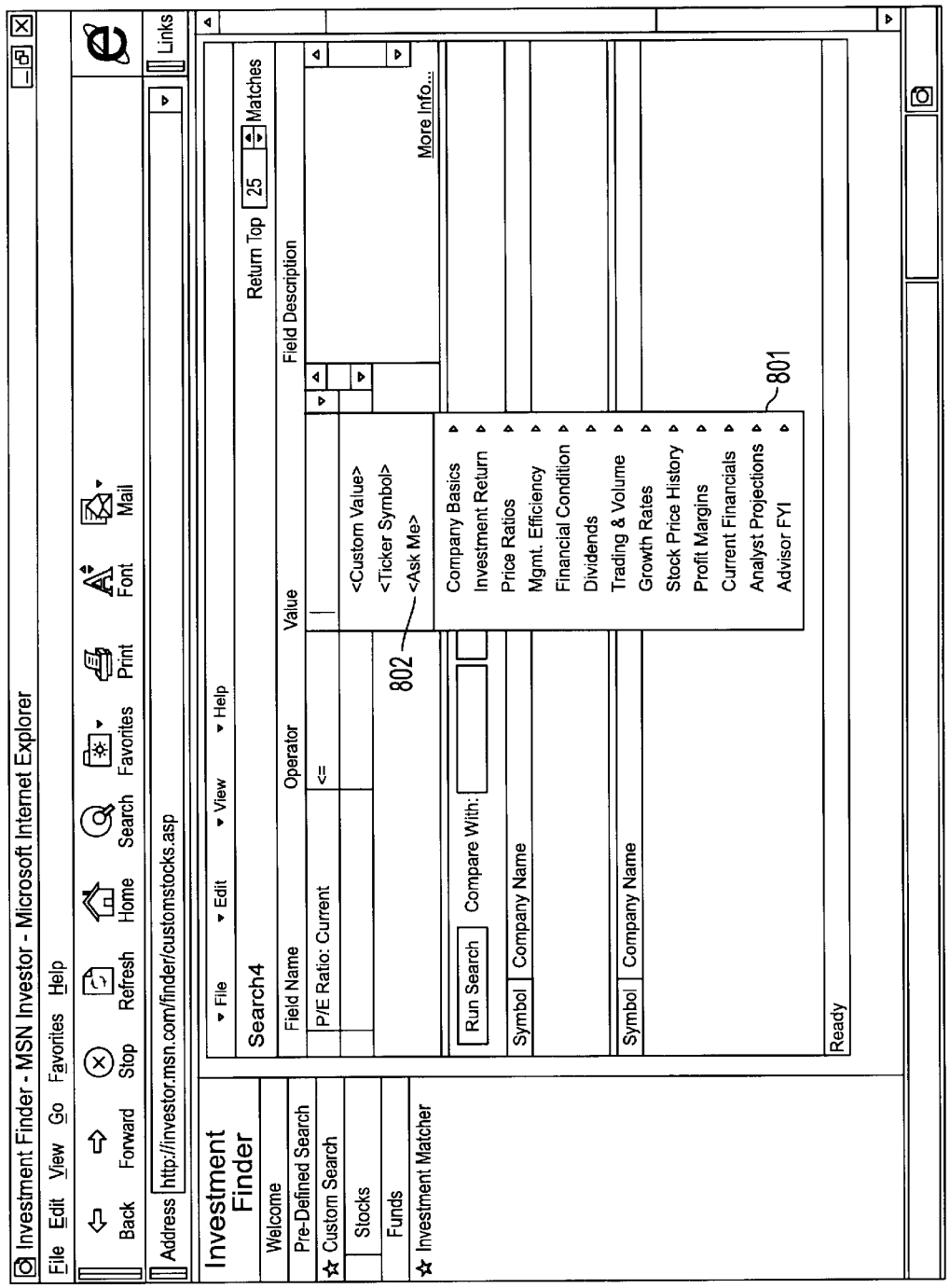
FIG. 8 shows a pull-down menu that permits a user to select a desired value for a field, including an "ask me" value 802 that leaves the desired value open until query execution time.

In FIG. 8, by clicking in the third cell of the first row of the query grid, the user is provided with a pop-down menu 801 that includes choices from which to select or specify a value of interest. By selecting "custom value," the user can enter a fixed quantity such as 40 in the cell. By selecting "ask me" 802, the user can indicate that the value will be specified at query execution time rather than query construction time. Further details of this feature are provided below.

Figure 9:
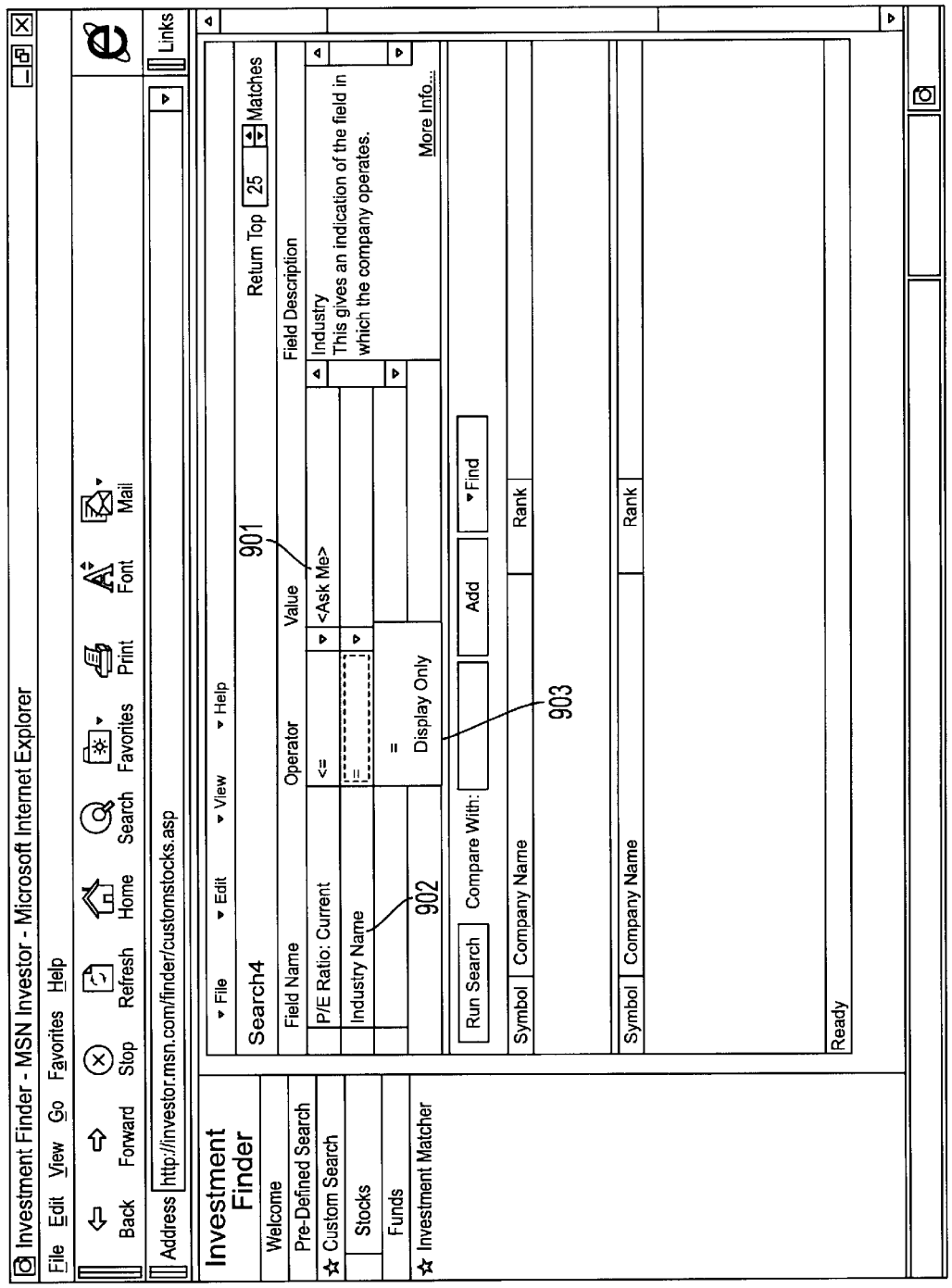
FIG. 9 shows a step of specifying a second row in a query grid as part of the query building process.

In FIG. 9, after the user has specified a field name, operator and value ("ask me" 901) for the first row of the query grid, a second row is automatically provided. Again, by clicking in each cell of the grid, a pop-down menu of choices for that cell is provided to the user. In FIG. 9, for example, the user has selected "Industry Name" for the second field name (902), and when the user clicks on the cell for "operator" in that row of the query grid, the only possible operators in menu 903 are "=" and "Display Only." This is because the "Industry Name" field is of a type that can only take on one of a set of discrete values (i.e., a "constrained list"), and other types of operators such as greater than or less than would be meaningless for such a field.

Figure 10:
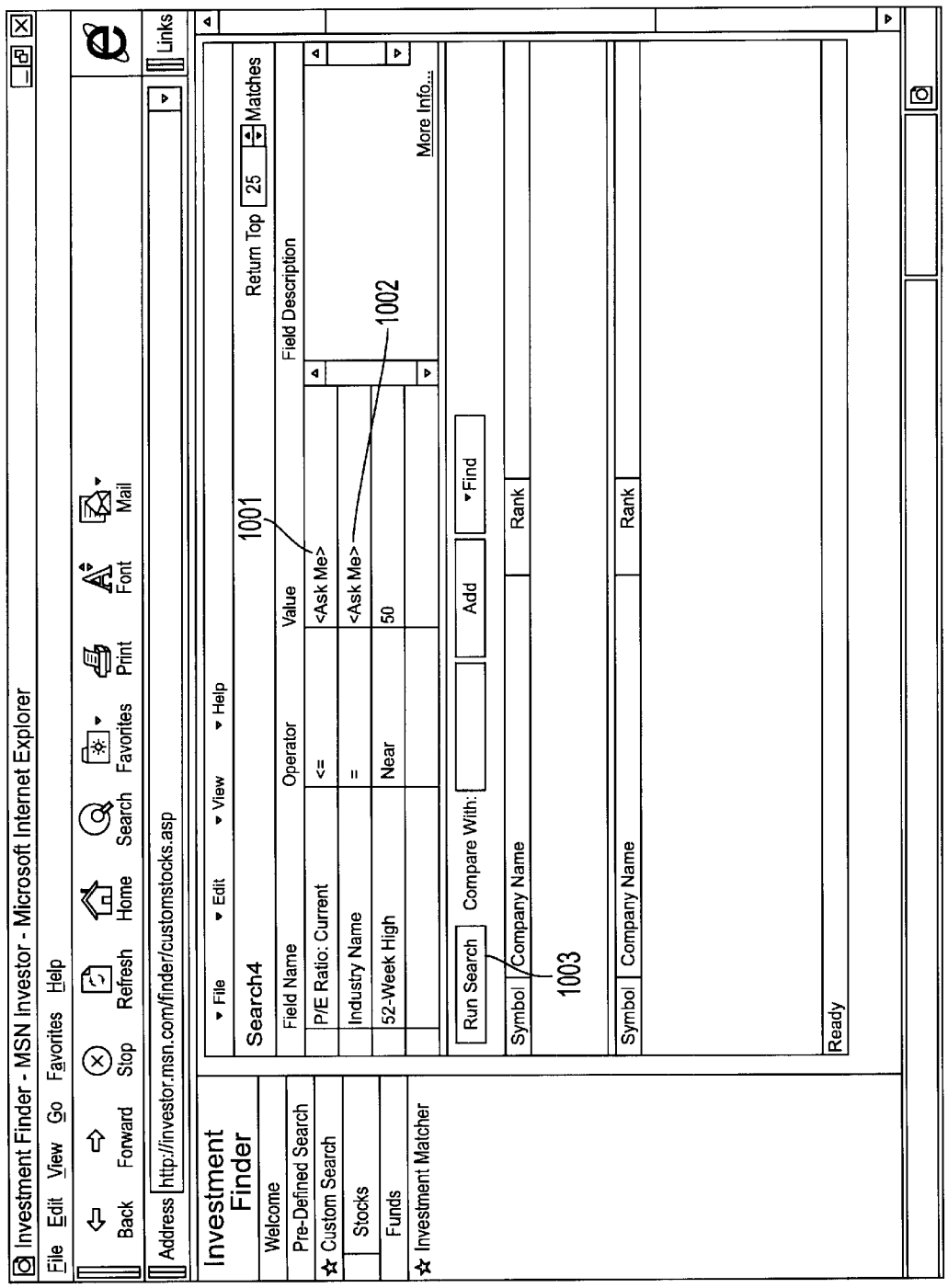
FIG. 10 shows a completed query grid including two desired values specified as "ask me" values and a third value specified as a fixed quantity.

Turning to FIG. 10, it is assumed that the user selected "ask me" for the Industry Name field, which is reflected in cell 1002. Additionally, the user has selected "52-Week High" as the third and final field name; "near" as the operator, and "50" as the custom value for that query. As shown in FIG. 10, the completed query thus consists of three discrete criteria that will be "ANDed" together to qualify the query results. The first criterion includes an "ask me" value 1001 that will require the user to supply a numeric input (i.e., P/E ratio) at query execution time. The second criterion includes an "ask me" value 1002 that will require the user to select an industry name from a constrained list at query execution time. The third criterion includes a custom value (50) that will not vary from query to query. The user can run the query by clicking on a button 1003 on the screen. (It will be appreciated that the actual phrase "ask me" need not appear in order to employ the inventive principles; any similar indicator will meet the structure, function, and purpose of this display element).

Figure 11:
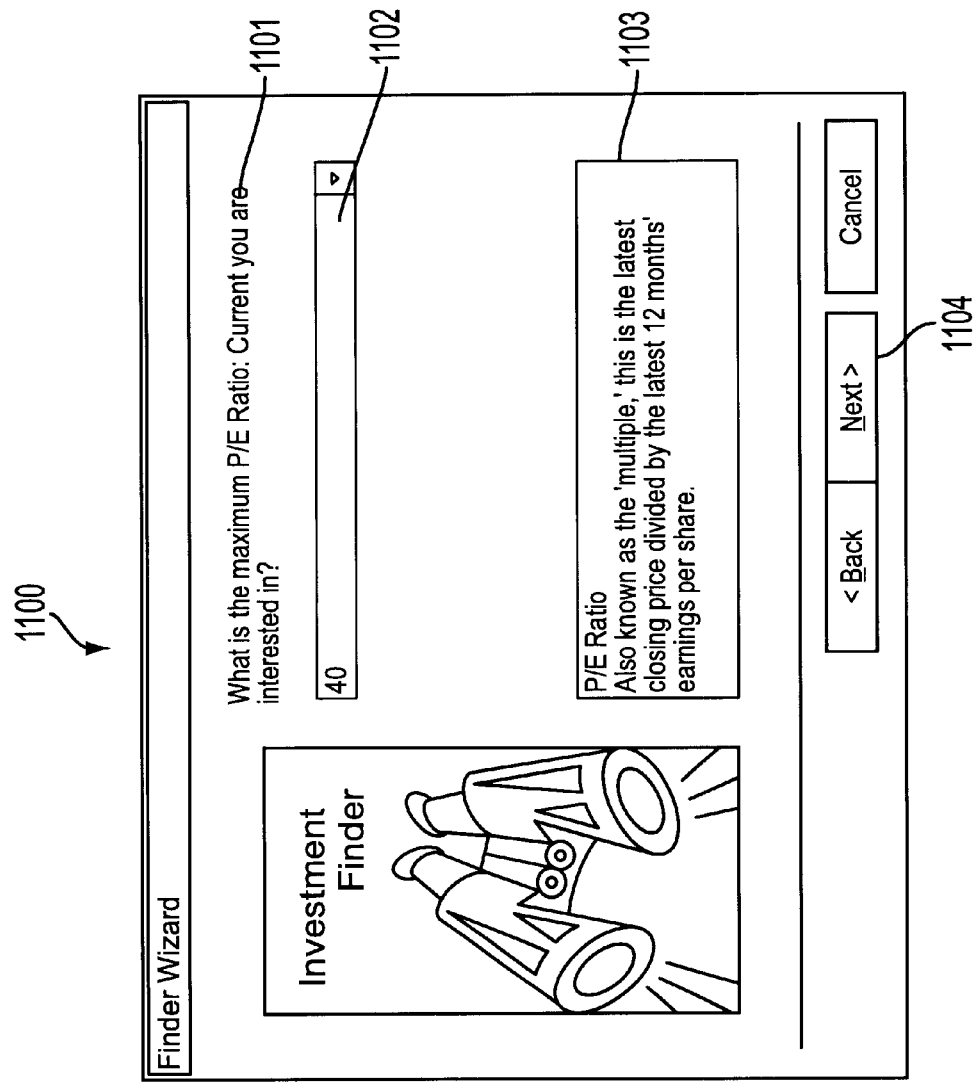
FIG. 11 shows a "wizard-type" dialog box that prompts the user at runtime to specify a desired value for P/E ratio.

Turning to FIG. 11, when the query is executed, a wizard-like dialog box 1100 is displayed to solicit user input for the first "ask me" value in the previously constructed query. The dialog box includes a simple question 1101 that incorporates both the operator ("<=") and the field name ("P/E Ratio: Current") in an easy-to-understand format, and a prompt area 1102 in which the user can specify a desired value for the field. Rather than displaying the operator "<=" in algebraic form, simple question 1101 preferably displays this operator as a simple English phrase (e.g., "what is the maximum"). Additionally, a descriptive information text area 1103 provides additional information regarding the field for which user input is required. After the user enters a desired value (40 in this case), a "next" button 1104 permits the user to advance to the next field that requires user input. ("Next" button 1104 corresponds to step 410 in FIG. 4).

Figure 12:
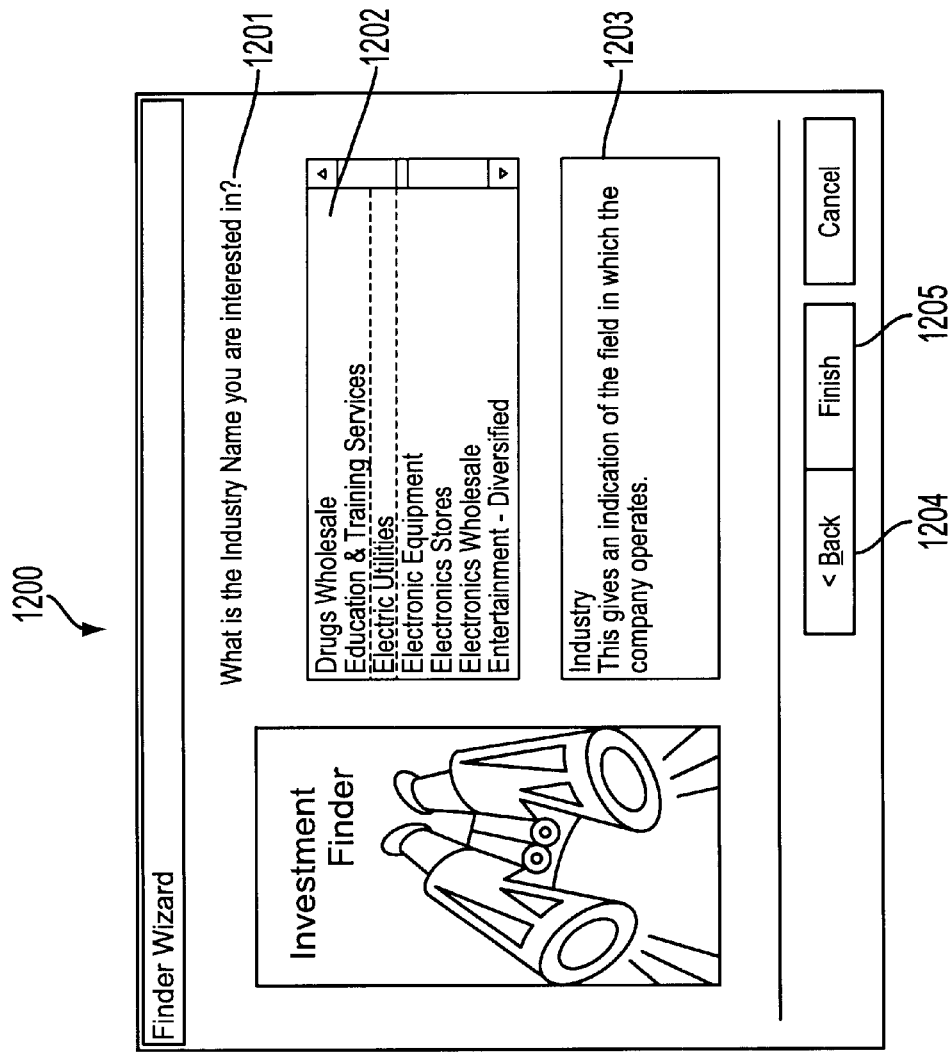
FIG. 12 shows a "wizard-type" dialog box that prompts the user at runtime to specify a desired value for industry name, which is selected from a constrained list.
Figure 15:
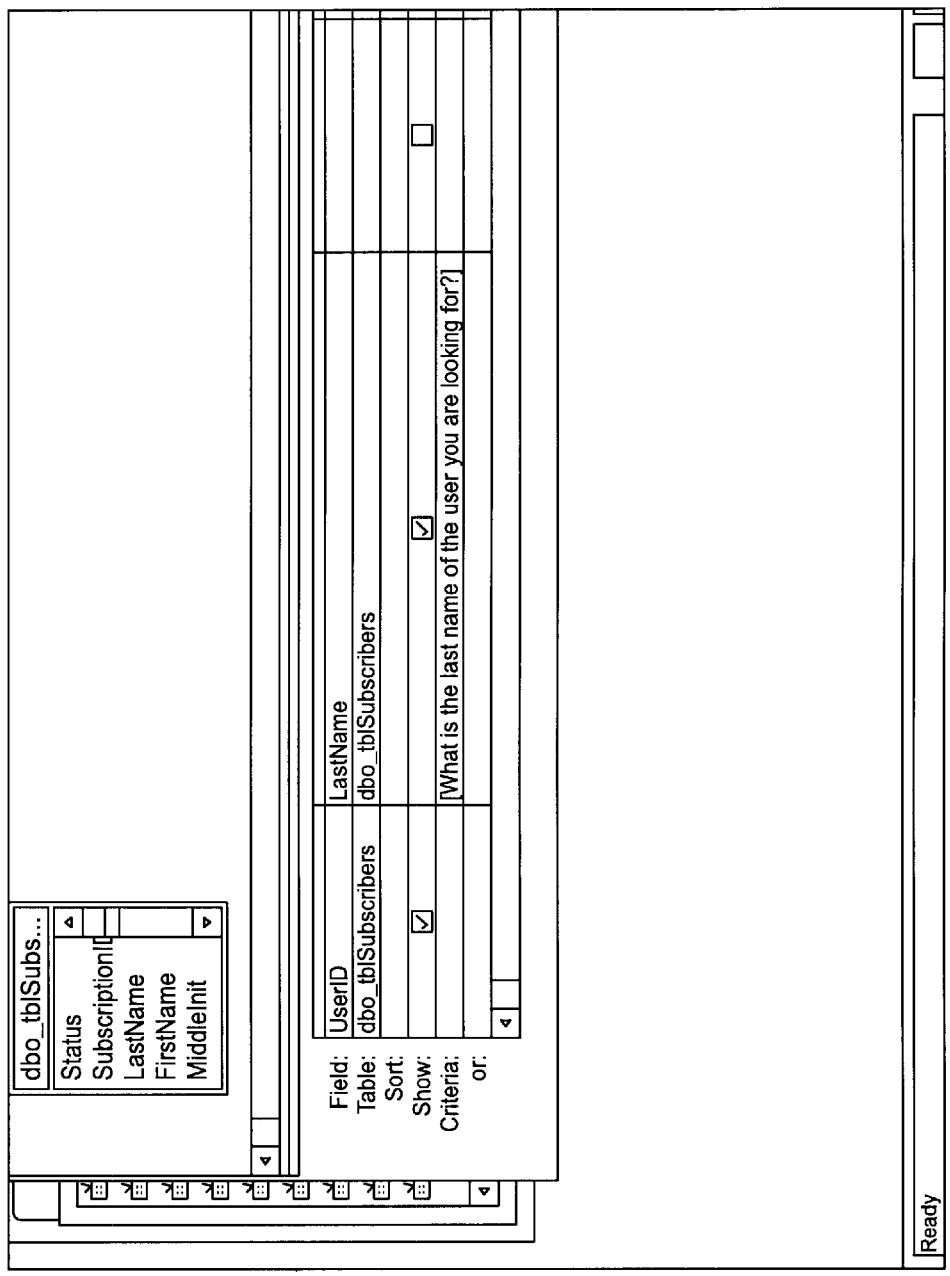
FIG. 15 shows how a user can create a "parameter query" technique using the Access database product sold by Microsoft Corporation.
Figure 16:
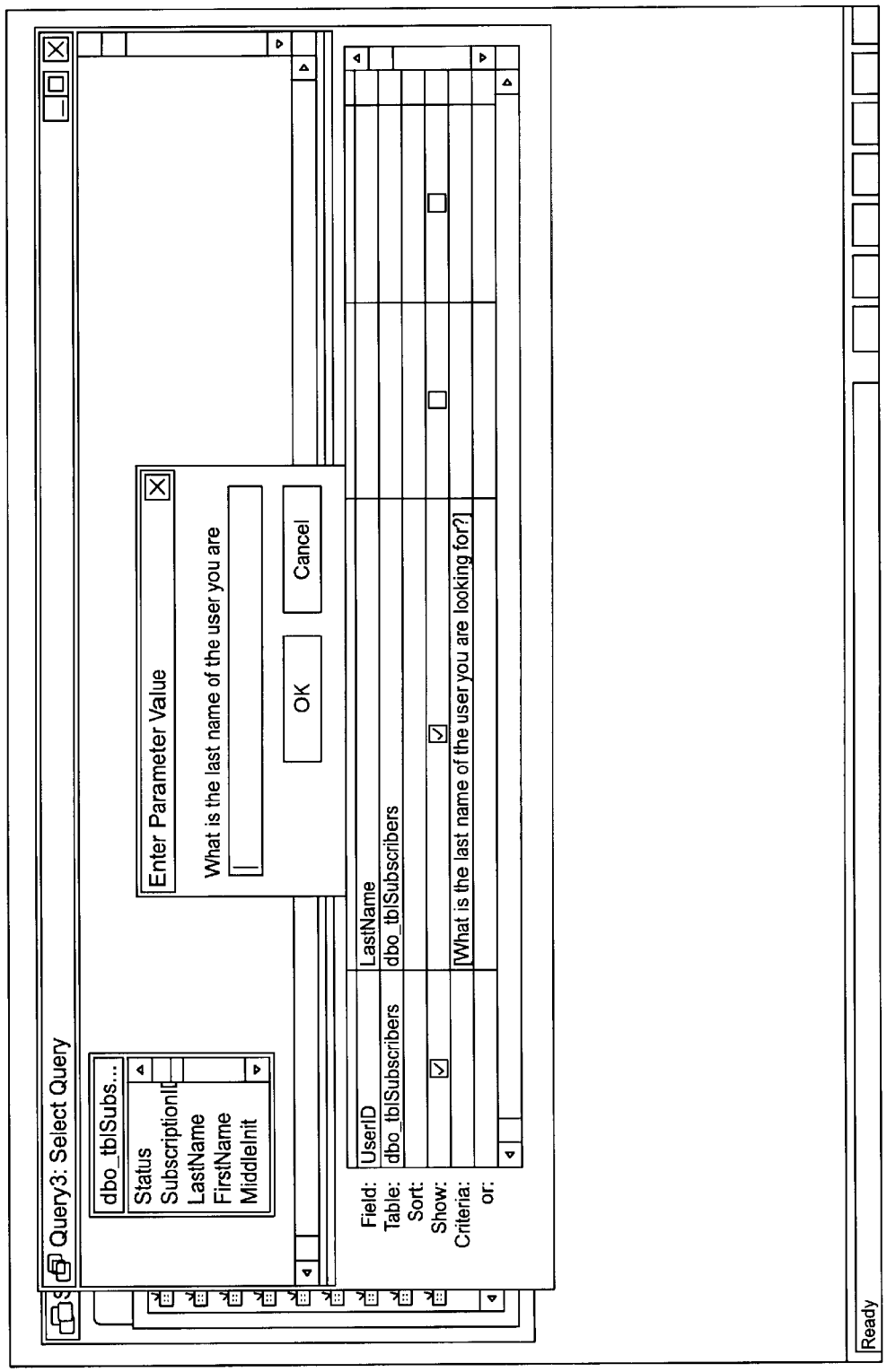
FIG. 16 shows a prompt generated when the query of FIG. 15 is executed.

In FIG. 12, the user is next prompted for an industry name in a wizard-like dialog box 1200. As in FIG. 11, the dialog box includes a simple question 1201 that incorporates the operator and field name in an easy-to-understand format, and a prompt area 1202 in which the user can specify a desired value for the field. In contrast to the dialog box in FIG. 11, the user must select an industry name from the list provided in prompt area 1202 (i.e., a "constrained list"). Although not shown in FIG. 12, one of the choices for Industry Name is "All," indicating that all industries will be selected and effectively eliminating any restrictions on that field. A "back" button 1204 permits the user to back up to the previously specified field value (i.e., FIG. 11), and a "finish" button 1205 permits the user to complete the query and cause it to be executed. If additional "ask me" values were included in the query, the "finish" button would instead be replaced with a "next" button. "Finish" button 1205 corresponds to step 408 in FIG. 4. Note that because the user previously specified a value of 50 for the 52-week high field, no prompt is required for that field.

Figure 13:
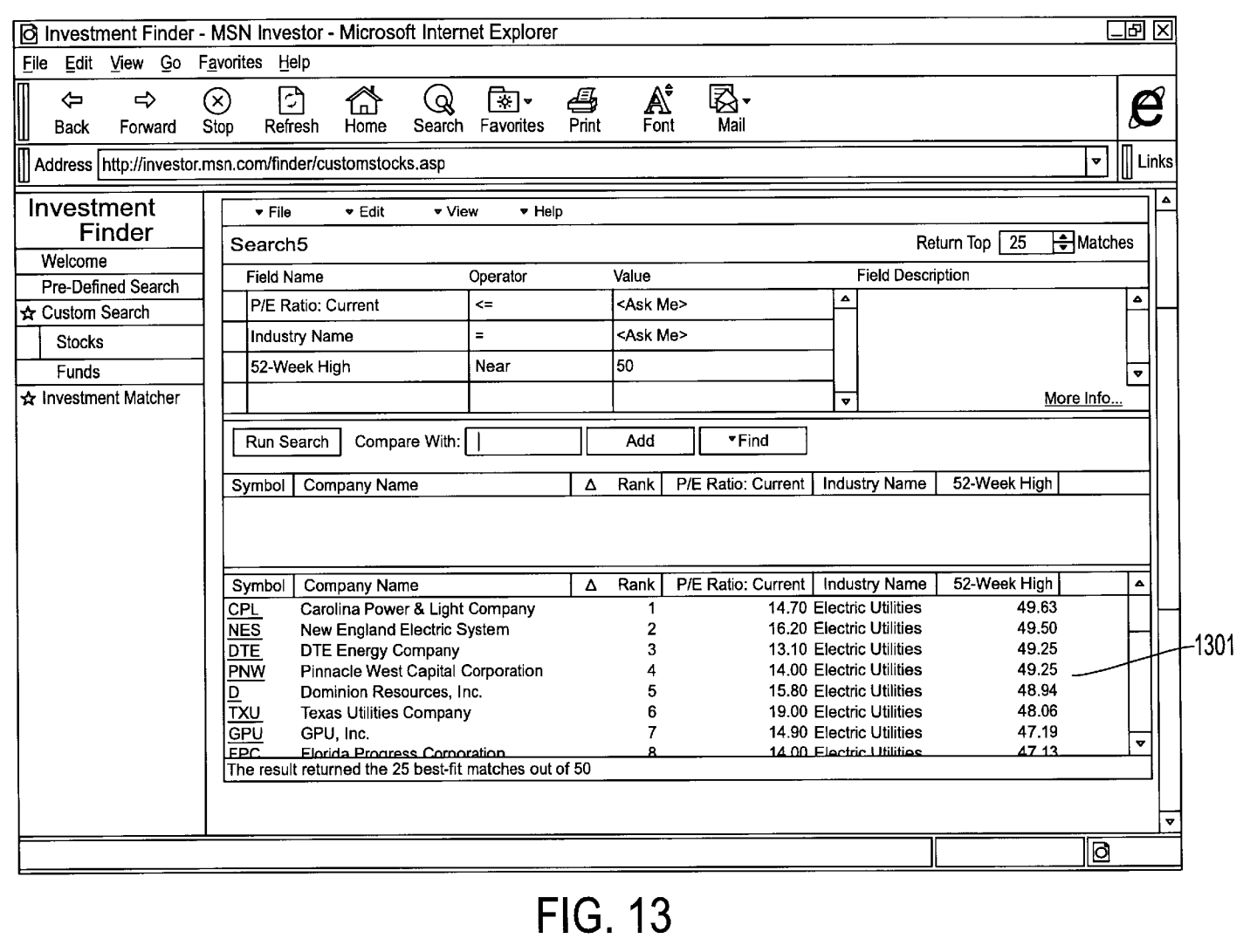

FIG. 13 shows the results of executing the query. As shown, a list of company symbols, rank, P/E ratio, industry name, and 52-week high price appears in query results area 1301. The results displayed in area 1301 meet all of the user's criteria, including two specified at query execution time (P/E ratio and industry name) and one specified in advance, when the query was initially created (52-week high price). It will be appreciated that for more complex queries including many rows of criteria, the "ask me" feature of the invention provides an easy-to-use method to tailor parts of a query without reconstructing the entire query. Moreover, the user is led easily through possible choices and prompted in a simple and comprehensible manner for desired values.

FIG. 14 shows a "comparison pane" feature that can be employed in conjunction with the principles of the invention. After obtaining query results, the user can enter a symbol in comparison box 1401 to compare a specific security with the query results. The database is then queried again for the selected symbol and for the same fields that formed the basis of the database query, and the comparison results are displayed in area 1402. Thus, for example, the user can quickly compare the P/E ratio, industry name and 52-week high price for a selected company (1402) with those meeting the user's query criteria (1403).

Various options on the display permit the user to store, retrieve, and edit previously stored queries. As shown in FIG. 14, for example, the user can store the displayed query under the default name "Search5" (1404), or can rename the query under a more memorable name.

Thus has been described a system and method for providing an easy-to-use query construction and reuse tool that permits a user to defer specifying one or more query parameters until query execution time. After constructing the query but just prior to executing the query, the user is prompted to provide desired values for the one or more deferred values, which may include a value from a constrained list. Many modifications and variations on the invention are of course possible, and the scope of the invention is defined only by the claims appended hereto.

We claim:

1. A computer-implemented method of creating and executing a database query, comprising the steps of:
   (1) specifying on a computer display a plurality of database query criteria, each criterion comprising a field identifier, an operator, and a desired value, wherein one or more of the desired values are specified as an "ask me" value that requires user input at query execution time;
   (2) upon detecting that a database query is to be executed, prompting a user to supply a value for all "ask me" values present in the plurality of database query criteria;
   (3) constructing a query string comprising the specified plurality of database query criteria and any values supplied in step (2); and
   (4) executing the database query using the constructed query string.

2. The method of claim 1, wherein step (1) comprises the steps of:
   (a) displaying a query grid comprising a plurality of cells arranged into field names, operators, and desired values; and
   (b) displaying a context-sensitive menu in each cell upon detecting that each cell has been selected, wherein the context-sensitive menu provides choices that can be specified for that cell.

3. The method of claim 1, wherein step (2) comprises the step of displaying a dialog box comprising a question that prompts the user, a data entry area, and a display element that advances to a next dialog box that prompts the user for a next "ask me" value.

4. The method of claim 1, wherein step (2) comprises the step of displaying a dialog box comprising a question that prompts the user; a constrained list of choices from which the user must select one; and a display element that advances to a next dialog box that prompts the user for a next "ask me" value.

5. The method of claim 4, further comprising the step of displaying a last dialog box comprising a "finish" display element which, when selected, causes the query to be executed.

6. The method of claim 1, further comprising the step of storing the plurality of database query criteria specified in step (1) under a user-selected query name.

7. The method of claim 1, wherein steps (1) through (3) are executed on a client computer using a web browser, and wherein step (5) is executed on a server computer that contains a database.

8. A computer-implemented method of querying a database, comprising the steps of:
   (1) displaying on a computer screen a query grid comprising a plurality of cells that define a database query, the cells including a first group of cells each of which permits a user to specify a database field; a second group of cells each of which permits the user to specify an operator to be applied to a corresponding one of the database fields; and a third group of cells each of which permits the user to specify a desired value for one of the database fields specified in the first group of cells;
   (2) specifying a database field for each of the first group of cells;
   (3) specifying an operator for each of the second group of cells;
   (5) specifying an "ask me" value for at least one of the third group of cells, wherein the "ask me" value causes the user to be prompted for a value just prior to the time that the query is executed; and
   (5) executing the database query by prompting the user to supply a value for any cell for which an "ask me" value was specified in step (5), adding any such prompted values to the previously specified fields and operators, and submitting the resulting query to a database engine.

9. The method of claim 8, wherein step (5) comprises the step of prompting the user for a numeric value.

10. The method of claim 8, wherein step (5) comprises the step of prompting the user to select a value from a list of choices, wherein the list corresponds to one of the database fields.

11. The method of claim 8, wherein step (5) comprises the step of displaying a dialog box comprising a simple question to prompt the user; a data entry area for specifying a value, and a "next" display element that advances to another dialog box to prompt the user for another "ask me" value.

12. The method of claim 8, wherein step (5) comprises the step of sequentially displaying multiple dialog boxes each comprising a simple context-sensitive question to prompt the user; a data entry area for specifying a value; and a "next" display element that advances to a next dialog box for specifying another "ask me" value.

13. The method of claim 8, further comprising the step of storing the database query on a computer for future use.

14. The method of claim 8, further comprising the steps of:
   (6) specifying a database field as a comparison point;
   (7) querying the database for results corresponding to the comparison point; and
   (8) displaying the results of the database query from step (7) in close proximity to the database results obtained in step (5) in order to permit comparison by the user.

15. A system for creating and executing database queries, comprising:
   a client computer including a web browser and a browser control element; and
   a server computer coupled to the client computer over a network, the server computer including a query parser that receives a query string from the network and generates a database query, and a query engine that executes the database query;
   wherein the browser control element generates a query grid display on the client computer comprising a plurality of cells arranged into fields, operators, and values; and
   wherein the browser control element permits a user of the client computer to specify an "ask me" value for one or more of the cells and which, when query execution is requested, prompts the user to supply a value for each such "ask me" value, generates the query string including any such supplied values, and transmits the query string to the query parser on the server computer.

16. The system of claim 15, wherein the browser control element, in response to detecting selection of a cell that can take on only a constrained set of values, displays to the user a list of possible values for that cell.

17. The system of claim 15, wherein the browser control element prompts the user to supply a value for each such "ask me" value by displaying a dialog box comprising a question phrase, a data entry area, and a "next" display element that causes a next dialog box to be displayed for entry of a next "ask me" value.

18. The system of claim 17, wherein the browser control element, when displaying a final dialog box corresponding to the last "ask me" value for the cells, displays a "finish" display element which causes the query to be executed.

19. The system of claim 15, wherein the browser control element further displays a comparison pane that permits comparison of database query results with a user-specified record separately queried from the database.

20. The system of claim 15, wherein the browser control element permits a user of the client computer to specify an "ask me" value of "All" for one or more of the cells, which causes the database to not restrict its results as to that value.

21. The system of claim 15, wherein the browser control element prompts the user to supply the value by displaying a simple phrase that incorporates a field name and operator without using algebraic syntax, and wherein the browser control element provides information explaining what the field name represents.

22. The system of claim 15, wherein the cells are further arranged into rows each corresponding to a discrete query criterion, and wherein the browser control generates the query string by logically "ANDing" each row to form a compound query.

* * * * *

UNITED STATES PATENT AND TRADEMARK OFFICE
CERTIFICATE OF CORRECTION

PATENT NO. : 6,285,998 B1
DATED : September 4, 2001
INVENTOR(S) : Neil Black et al.

It is certified that error appears in the above-identified patent and that said Letters Patent is hereby corrected as shown below:

Column 10,
Line 24, "step (5)" has been replaced with -- step (4) --;
Line 42, "(5)" has been replaced with -- (4) --;
Line 48, "(5)" has been replaced with -- (4) --.

Signed and Sealed this

Fourteenth Day of January, 2003

JAMES E. ROGAN
*Director of the United States Patent and Trademark Office*